United States Patent [19]

Thebault

[11] Patent Number: 4,547,065
[45] Date of Patent: Oct. 15, 1985

[54] DEVICE FOR SIMULTANEOUSLY PRINTING AND DEVELOPING PHOTOGRAPHS

[75] Inventor: Claude Thebault, Meylan, France
[73] Assignee: KIS France, Grenoble, France
[21] Appl. No.: 536,399
[22] Filed: Sep. 27, 1983

[30] Foreign Application Priority Data

Oct. 5, 1982 [FR] France ................ 82 16841
Mar. 18, 1983 [FR] France ................ 83 04698

[51] Int. Cl.⁴ .................. G03B 27/80; G03B 27/52
[52] U.S. Cl. ........................ 355/28; 355/29; 355/38
[58] Field of Search ................ 355/27–29, 355/35, 38, 41

[56] References Cited

U.S. PATENT DOCUMENTS

| | | | |
|---|---|---|---|
| 1,157,611 | 10/1915 | Beidler | 355/28 |
| 3,164,056 | 1/1965 | Wick et al. | 355/38 |
| 3,308,717 | 3/1967 | Okishima et al. | 355/28 |
| 3,335,636 | 8/1967 | Atkinson | 355/27 |
| 3,665,486 | 5/1972 | Sato | 355/28 |
| 3,689,150 | 9/1972 | Nothmann et al. | 355/64 |
| 3,737,227 | 6/1973 | Harter et al. | 355/74 |

FOREIGN PATENT DOCUMENTS 2050012 11/1971 Fed. Rep. of Germany .
2070792 9/1981 United Kingdom .

Primary Examiner—L. T. Hix
Assistant Examiner—Della J. Rutledge
Attorney, Agent, or Firm—Parkhurst & Oliff

[57] ABSTRACT

The invention relates to a device for simultaneously printing and developing photographs, of the type essentially comprising three main assemblies, namely, respectively:
 a first exposure assembly A,
 a second assembly B in camera obscura;
 a third developing assembly C,
characterized in that the cutting part of the fixed knife defines on the light-sensitive paper the part exposed by the light beam issuing from the lens.

3 Claims, 5 Drawing Figures

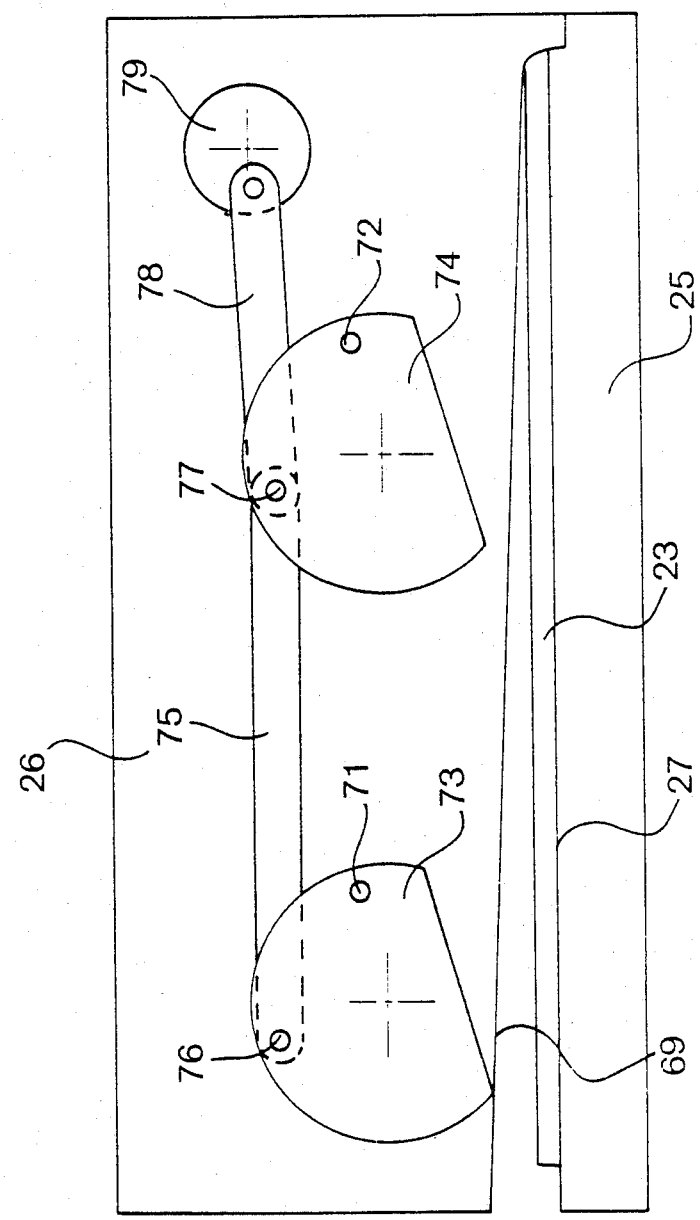

DEVICE FOR SIMULTANEOUSLY PRINTING AND DEVELOPING PHOTOGRAPHS

The invention relates to an automatic device for simultaneously printing and developing photographs, particularly in colour.

Applicant's European Patent Application filed Apr. 8, 1982 under No. 82 420051 and published under No. 0064015, describes an integrated automatic device for simultaneously printing and developing photographs, of which the essential feature is that the three so-called "exposure" assembly A, "camera obscura" assembly B and "developing" assembly C are arranged according to a particular disposition. The "camera obscura" assembly B comprises an apparatus delivering light-sensitive paper is unfortunately limited to one format only, both in width and in length, unless, but only regarding the width, the cartridge of light-sensitive paper is changed. A considerable amount of paper is consumed by this arrangement. Now, apparatus are being sought more and more which make it possible simultaneously to print and develop photographic films of diverse formats and quality.

The invention overcomes these drawbacks.

It relates to a device of the type in question which is simple, economical, reliable, reduces the consumption of light-sensitive paper and is capable in particular of being easily adapted to highly varied print formats, without having to change the cartridge supplying light-sensitive papers.

The invention relates to an improved integrated automatic device for simultaneously printing and developing photographs, particularly in colour, of the type comprising three main assemblies, namely:

a first so-called exposure assembly A, constituted by an exposure lamp, a filtering system, an optical system formed by the frame receiving the film and the magnifying lens;

a second assembly B comprising, in a camera obscura, a member for supplying light-sensitive paper, a member for delivering a determined length of paper constituted by two parallel disengageable rollers maintained under pressure, one driving; the other pressing, shears adapted to cut this length of paper, formed by a fixed knife and a mobile knife disposed in the same horizontal plane;

a third so-called developing assembly C, comprising means for guiding the cut-out sheet of exposed paper, a succession of developing baths and a drying section and means for advancing the cut-out exposed sheet in these different treatment sections.

This improved device is characterized in that the cutting part of the fixed knife defines on the light-sensitive paper the part exposed by the light beam issuing from the lens.

In other words, the distance between the optical axis of the exposure assembly A and the fixed knife of the shears is equal to half the paper to be delivered.

Advantageously and in practice:

the fixed knife is disposed just below and plumb with the plane of tangency of the two delivery rollers;

the reserve of light-sensitive paper formed by a light-proof cartridge is placed on a so-called delivery box containing a member delivering light-sensitive paper, the bottom of this box presenting a slot through which the delivered paper passes, this slot being limited on one side by said fixed knife;

at rest, the slot of the delivery box is obturated in a light-proof manner by the mobile knife which covers the fixed knife;

the driving roller of the delivery member is mounted in an end plate and the presser roller is mounted idly at the end of a connecting rod articulated at its other end on said end plate, a return spring fixed on the end plate and on the connecting rod maintaining the presser roller under pressure on the driving roller, this connecting rod presenting a ramp in the form of a cam adapted to cooperate with a shaft parallel to the delivery rollers, this shaft presenting a notch adapted to cooperate with said cam, said shaft being adapted to rotate about its axis;

the mobile knife of the shears is moved with the aid of a motor which drives a first connecting rod which in turns drives a second connecting rod of which the two ends are fixed and articulated on two oscillating plates each fastened by a pin to the mobile knife;

the optical assembly A presents means which cooperate with the means for adjusting:
the length of light-sensitive paper to be delivered,
the time of exposure of the exposure lamp,
the optical assembly also comprises a means for checking whether the width of the light-sensitive paper is correct.

The invention will be more readily understood on reading the following description with reference to the accompanying drawings, in which:

FIG. 1 schematically illustrates a device for simultaneously printing and developing photographs according to the invention.

FIG. 5 is a view in horizontal section showing the member for driving the knives.

Figure 1:
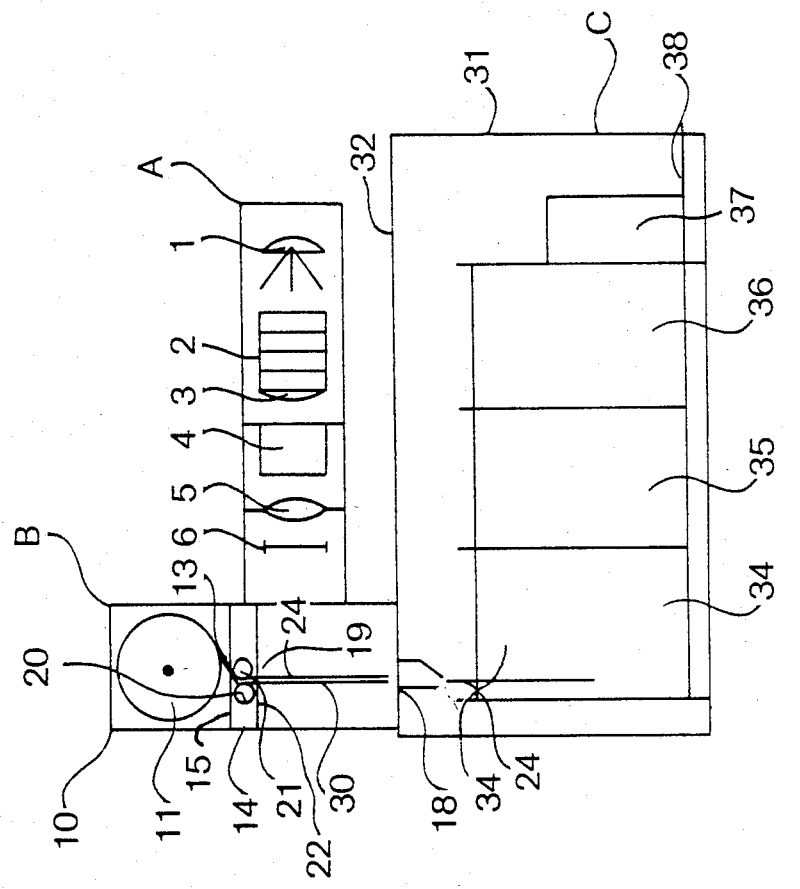
Figure 2:
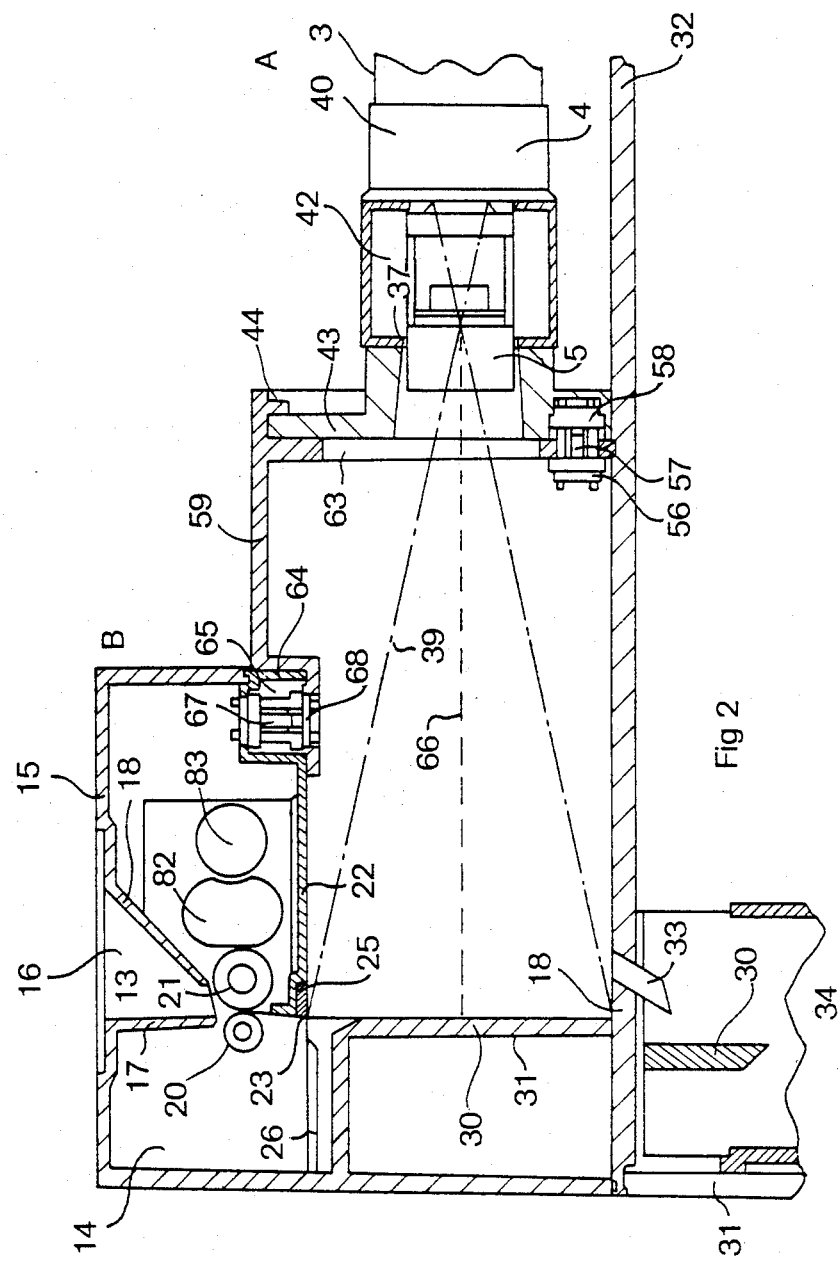
FIG. 2 is a view in section of assemblies A and B characteristic of the invention.

Referring now to the drawings, the printing and developing device shown in FIG. 1 and in detail in FIG. 2 is similar to the one described in European Patent Application No. 0064015 mentioned above. This device essentially comprises three distinct assemblies A, B and C, namely, respectively:

a first so-called exposure assembly A comprising:
an exposure lamp 1,
a filter 2,
a diffuser 3,
an optical assembly formed by a frame 4 adapted to receive the film to be printed,
a magnifying lens 5,
a shutter diaphragm 6;

a second assembly B, is a camera obscura, or "dark room" unit, perpendicular to A, essentially comprising two distinct parts:
a first part constituted by a light-proof cartridge 10 containing a rotating reel 11 of light-sensitive paper 12 which emerges from cartridge 10 through a slot 13,
a second part constituted by a box 14 made of plastic material or the like (zamac), on the top of which (15) the cartridge 10 rests; on this top part 15 is cut a slot 16 which coincides with slot 13; this slot 16 is formed by two inclined plates 17-18 which guide the paper 12 when it penetrates between the two delivery rollers 20 and 21 shown in detail in the following Figures; the bottom 22 of this delivery box 14 presents a slot 23 for the passage of the delivered paper 24; on the lower face of this bottom 22 are fixed the shears 19 constituted by a fixed knife 25 and by a mobile knife 26, shown in detail in FIG. 5; the slot 23 and consequently the cutting part 27 of the fixed knife 25 is located just below and plumb with the line of tangency of the two delivery rollers 20-21; this slot 23 may possibly be slightly offset with respect to this perpendicularity, in order to ensure that the delivered paper 24 is applied on the support plate 30;

a vertical support plate 30 located beneath the box 16 plumb with the slot 23 on which the delivered sheet of paper 24 is applied during exposure.

a third so-called developing assembly C essentially comprising a frame 31 with its cover 32 in which is formed a funnel 33 placed beneath orifice 18; beneath this funnel 33 are placed three treatment vats containing, respectively, the developer agent 34, the bleaching-fixing agent 35 and washing agent 36, then the so-called drying section 37 with its receptacle 38 for receiving the finished photo.

The bearing plate 30 is fixed.

It is indispensable for the cutting part 27 and more precisely the lower edge of this fixed knife 25 to define on the light-sensitive paper 24 delivered, applied against the plate 30, that part which will be exposed by the beam 39 issuing from the exposure assembly A, and more precisely from lens 5. In other words, the knife 25 forms a mask for the light beam 39. This arrangement is most favourable for obtaining photographs of which the edges are net and for which only the optimum surface of paper is used.

Figure 3:
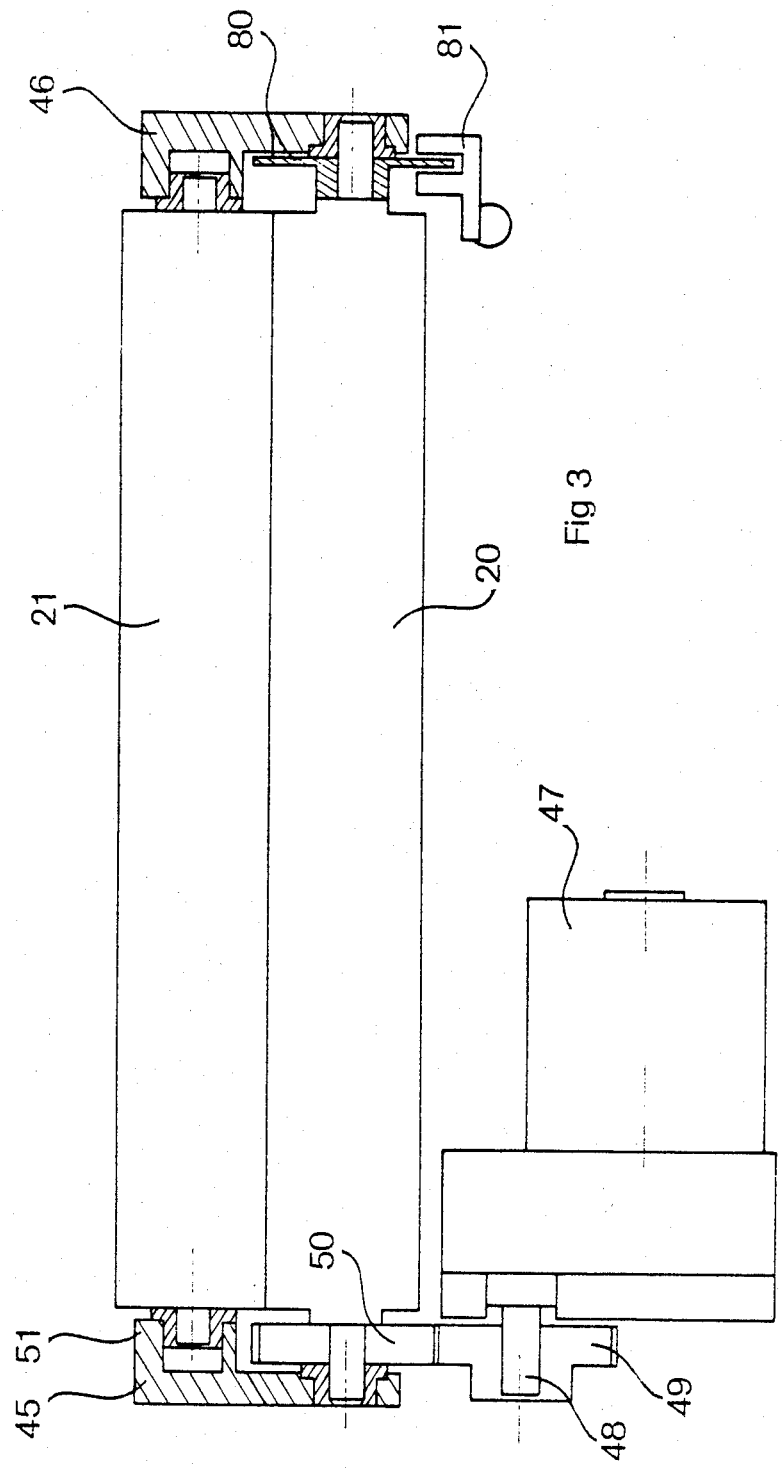
FIG. 3 is a view in horizontal section passing through the axes of rotation of the two delivery rollers.
Figure 4:
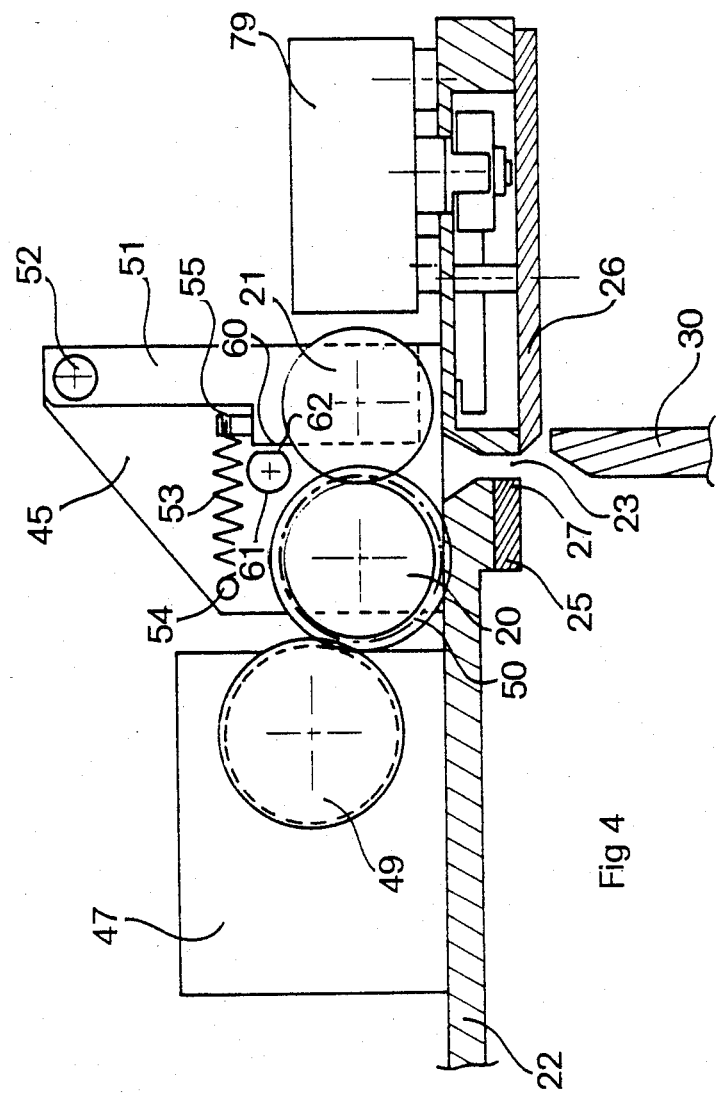
FIG. 4 is a side view of these delivery rollers.

The delivery member (cf. FIGS. 3-4) comprises two end plates 45-46 disposed on each of the inner walls of the delivery box 14. The end of the rollers 20-21 rests on bearings. A gear-down motor 47 drives by a driven shaft 48 a pinion 49 which meshes on a pinion 50 borne by the driving roller 20. The disengageable presser roller 21 is mounted idly at the end of a connecting rod 51 articulated at its other end 52 on the end plate 45. A return spring 53 is fixed at one end 54 on the end plate 45 and at its other end 55 on the connecting rod 51, so as to maintain the driven roller 21 under pressure against 20.

To introduce the sheet 12 (cf. FIG. 4), the connecting rod 51 presents on the inner side a ramp 60 in the form of a camp adapted to cooperate with a shaft 61 parallel to the two rollers 20 and 21. This shaft 61 presents opposite the ramp 60 a notch 62 adapted to cooperate with the ramp 60. By rotating the shaft 61, the notch 62 bears on the ramp 60 which moves the connecting rod 51 away. By thus separating the rollers, the light-sensitive paper 12 may therefore be introduced.

The shears (cf. FIG. 5) operate as follows: The fixed knife 25 is screwed on the bottom 22 of the box 14 in the immediate vicinity of the slot 23. The mobile knife 26 of which the cutting edge 69 is inclined or presents the form of a very open V, is formed by a plate fastened by two pins 71 and 72 with two horizontal oscillating plate 73 and 74 connected together by a connecting rod 75 bearing on fixed but articulated pins 76-77. This connecting rod 75 is moved by another and connecting rod 78 also bearing at 77 connected to the control pin of a gear-down motor 79. In this way, a progressive approach movement of the edge 69 of the mobile knife 26 towards the cutting part 27 of the fixed knife 25 is obtained. As has already been stated, the face 27 advantageously lies plumb with the line of tangency of the two rollers 20-21.

At rest, the mobile knife 26 entirely covers the fixed knife 25, so as to ensure light tightness.

To determine the length of paper delivered (cf. FIG. 3), the free end of the driving roller 20 bears a segmental disc 80 cooperating in known manner with an optoelectronic reader 81.

The two gear-down motors 47 and 79 are controlled in synchronism by an appropriate conventional member (not shown).

As has already been stated (cf. FIG. 2), the optical assembly A essentially comprises the frame 4 and the lens 5. The frame is of the type described in European Patent Application No. 0064015 mentioned hereinabove. This frame essentially comprises a receptacle 40 for the filtering assembly 2-3 and a bevelled passage for the film to be printed.

The receptacle 40 is associated with another box 42 at the end of which the lens 5 is disposed. A photo-electric cell 37, for example of CdS type, is associated with an exposure meter to enable the amount of light passing through the film to be measured in order to correct the exposure time of the over or under exposed films.

This optical assembly A is mounted on a rigid panel 43 made of plastic material. This panel 43 is clipped on the front inlet face 44 of the body. This panel 43 comprises at its base an electrical multipoint connector 56, for example of the type with twenty pins, ref. STAF of HARTING ELEKTRONIK GmbH.

The male pins 57 of the contactor 56 are fixed on the plate 43 whilst the female pins 58 are fixed on the frame 59 of the "camera obscura" assembly B. A window 63 is made in the frame 59 on the inlet face to allow the light beam 39 issuing from the lens 5 to pass.

The frame 59 and the plate 43 are made of moulded plastic material. The upper face of the frame 59 comprises a second opening 64 adapted to receive an electrical contactor 65 similar to 56. An electronic control board, clipped in the frame of B, bears the different electrical connection circuits and the control elements such as relays, electronic components, etc... This board (not shown) is connected to the source of electricity.

The window 63 must be sufficiently large to admit the different types of optical assembly 4-5. In this way, if a small format is desired, the lens 5 will then be placed at the top of the window 63, whilst, on the other hand, if a larger format is desired, it will be placed towards the bottom.

By construction, the distance between the optical axis 66 and the axis of cut of the paper which is defined by the fixed knife 25 and more precisely 27 on which the image to be reproduced is projected, is equal to half the length to be delivered, which thus avoids any adjustment and consequently reduces sources of errors.

The optical assembly 4-5 bears on body 42 means of identification such as for example the format of the film to be printed and the print format.

The electrical contactor 56 is connected by its male pins 57 respectively; to the exposure lamp 1, to the motor for advancing the film to be printed, and to the cell 37 for metering the quantity of light. The other male pins 57 serve to identify the optical assembly. To this end, when the assembly is placed in position, if the current passes in a determined pin, this means that the appropriate frame for such a format and for such a film is positioned. If not, the electric current would not pass.

At the same time, the female pins 58 are connected to the electronic control board.

To reduce the number of pins, the information given by these pins are coded in binary form. Thus, for a connector 56 comprising twenty pins, there will be:

two pins for electrical supply, for example 12 V, eight pins will serve for advance programming of the paper 12; as this programmation is effected in binary form, millimeter by millimeter advances may thus be obtained, two pins will serve to control the advance of the motor driving the film;

one pin will serve to detect the presence of the frame 4, this enabling no-load tests to be made;

two pins will serve to supply the projection lamp 1;

two pins will serve for the cell 37 metering the quantity of light;

two pins will serve for the potentiometer adjusting the exposure time.

The electrical connector 65 placed in the opening 64 of the frame of the camera obscura assembly B also comprises twenty male pins 67, namely, respectively:

two pins for electrical supply;

one pin for the motor 82 driving the paper and more precisely the delivery rollers 20-21;

one pin for controlling the motor 83 of the shears 26 (cf. FIG. 2);

two pins for controlling the microswitches of the closed shears;

one pin for the end of cycle microswitch;

two pins for the photoelectric detector of the length of paper.

The female pins 68 of this electrical connector 65 are also connected to the electronic control board.

The simultaneous printing and developing device according to the invention is therefore characterized by optical frame 4 - lens 5 assemblies, associated with electrical connectors 56-57-58, these optical assemblies presenting identification means and means 56-57 which cooperate with the means for adjusting:

the length of paper to be delivered, the exposure time.

The principal stages of operation are therefore as follows:

the positioning of the camera obscura assembly 11-14 on the horizontal chamber 31;

the recoil of the mobile knife 26;

the delivery of an appropriate length of paper 24 by the delivery roller 20-21, depending on the code provided by the frame 4;

the exposure of the paper 24 applied on the plate 30, until the cell 37 located towards the lens 5 has received the quantity of light necessary for a good print;

cutting of the exposed part by the knife 25-26, the exposed cut paper 24 dropping through the opening 18 in the developing assembly C.

The film advance motor possibly presents the following view and the cycle starts again.

The appropriately choosing the optical assembly 4-5 associated with the electrical connectors 56-65 cooperating with the electronic board, the operator may print films of special formats without having to use different equipment, but simply by playing on the choice of the optical assembly 4-5.

This solution therefore offers a certain saving as far as manufacture of this equipment is concerned, since, depending on the formats desired by the buyer, it suffices simply to modify the optical assembly. In addition, the device is also safe for the operator.

This device thus enables very varied formats to be treated. In addition, it is of simple construction and easy to use. This device is reliable, compact and may treat black and white or coloured photos equally well.

What is claimed is:

1. An improved integrated automatic device for simultaneously printing and developing photographs, comprising:

(a) an exposure unit comprising a lamp, a filtering assembly, and an optical assembly formed by a frame and a lens, the exposure unit issuing a light beam;

(b) a dark room unit comprising:

(i) a light proof cartridge containing light sensitive photographic paper and a first slot for feeding said paper from said cartridge;

(ii) a box on the top of which said cartridge rests;

(iii) a delivering member for delivering a predetermined length of said paper, the delivering member having two disengageable parallel delivery rollers maintained under pressure, one driving, the other pressing;

(iv) a second slot in the bottom of said box just below the two rollers and substantially in line with the first slot to allow the passage of the delivered paper therethrough; and (v) a cutter for cutting the paper after said predetermined length of paper has been delivered, said cutter having a fixed knife and a mobile knife disposed below said second slot, said fixed knife being disposed just below and substantially plumb with the plane of tangency of the two delivery rollers, and defining on the delivered light sensitive paper a part thereof to be exposed by said light beam, said mobile knife in a rest position entirely covering said second slot to seal the same in a light tight fashion;

(c) a developing unit comprising treatment vats and means adapted for advancing an exposed sheet of paper through the different vats.

2. The device of claim 1, wherein the optical assembly of the exposure unit further comprises means for adjusting exposure time comprising a multipoint electrical connector in which:

male pins disposed on the optical assembly are connected to the exposure lamp, to a motor advancing film to be printed, to a photocell for metering the quantity of light in said light beam and to a member for adjusting the exposure time;

female pins disposed opposite said male pins on said dark room unit are connected to an electronic board in the dark room unit having electrical connections to elements controlling means for delivering and cutting said paper.

3. The device of claim 1, wherein the delivery member of the dark room unit further comprises a means for adjusting the predetermined length of paper to be delivered comprising a multipoint electrical connector in which:

male pins disposed on the bottom of the delivery member are connected to an electronic board of said dark room unit;

female pins disposed on the top of a dark room unit frame are connected to motors for driving the delivery rollers and the cutting shears, and to a detector for determining the length of paper.

* * * * *